United States Patent [19]

Kimisawa

[11] Patent Number: 5,158,353
[45] Date of Patent: Oct. 27, 1992

[54] CARD CASE FOR AUTOMOBILE

[75] Inventor: Tosihide Kimisawa, Yokohama, Japan

[73] Assignee: Nifco Inc., Yokohama, Japan

[21] Appl. No.: 716,448

[22] Filed: Jun. 17, 1991

[30] Foreign Application Priority Data

Jun. 18, 1990 [JP] Japan ................................. 2-64233

[51] Int. Cl.⁵ .................... B60Q 3/00; B60R 7/04; A45C 11/18
[52] U.S. Cl. ..................... 362/833; 362/80; 362/74; 296/153; 224/277; 206/39
[58] Field of Search ............ 362/80, 83.3, 74; 296/153, 37.8; 224/277, 42.42, 311; 206/38, 39, 39.4

[56] References Cited

U.S. PATENT DOCUMENTS

| | | | |
|---|---|---|---|
| 850,826 | 4/1907 | Fraser | 206/39 |
| 1,701,106 | 2/1929 | Gohn | 224/277 |
| 2,675,983 | 4/1954 | King | 362/80 |
| 2,713,368 | 7/1955 | Thomas | 206/39 |
| 4,934,520 | 6/1990 | Okada | 206/39 |

FOREIGN PATENT DOCUMENTS

| | | | |
|---|---|---|---|
| 1043403 | 11/1953 | France | 296/153 |
| 3-90985 | 9/1991 | Japan. | |
| 20719 | of 1914 | United Kingdom | 296/37 |
| 2087811 | 6/1982 | United Kingdom | 296/153 |

*Primary Examiner*—Ira S. Lazarus
*Assistant Examiner*—Y. Quach
*Attorney, Agent, or Firm*—Schwartz & Weinrieb

[57] ABSTRACT

A card case is mounted within the vicinity of the driver's seat of an automobile for accommodating and holding therein a magnetic card. The card case has a card accommodation portion which is provided upon the inner surface thereof with an illuminating means. The card accommodation portion is also provided therein with a push member pushed inwardly by means of the insertion of a card, biasing means for biasing the push member in the direction of extracting the card, and a latch device for latching the push member at a card accommodation position within the card accommodation portion and, when the push member is pushed in further from the card accommodation position, for releasing the latched push member within the card accommodation portion. The push member is made of a light conductive material.

10 Claims, 7 Drawing Sheets

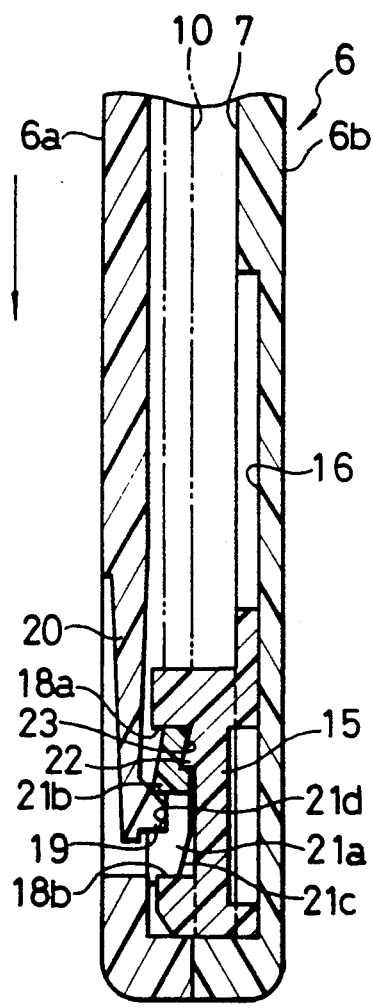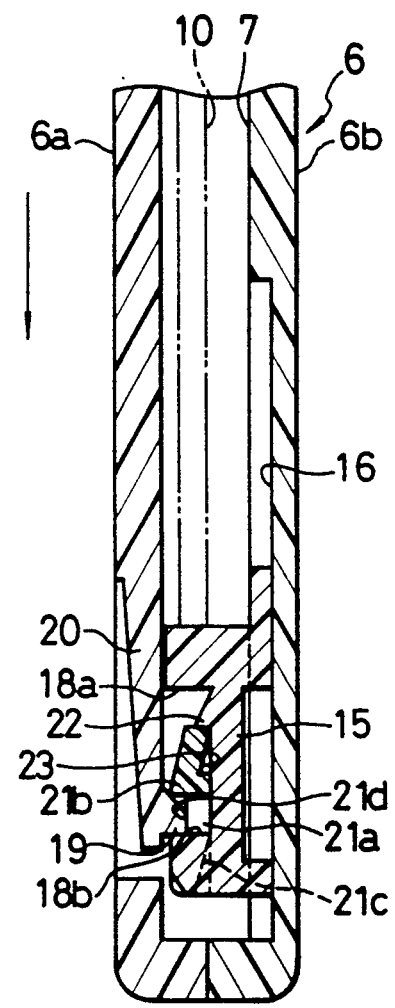

FIG.10
FIG.11
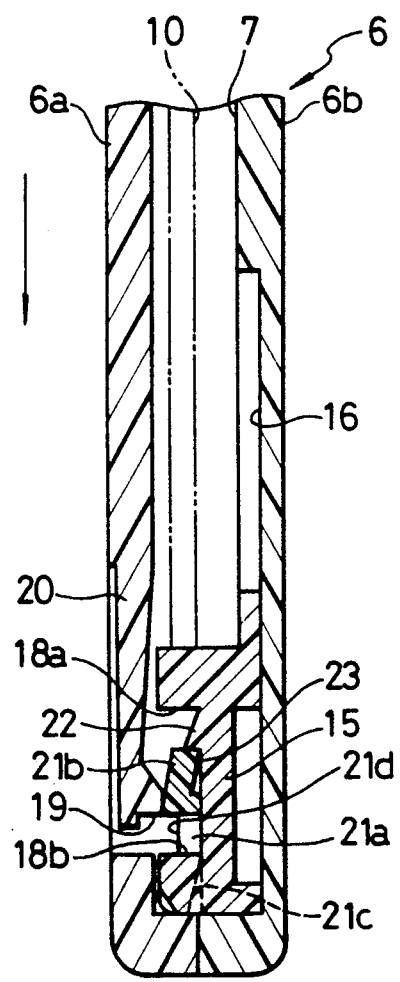
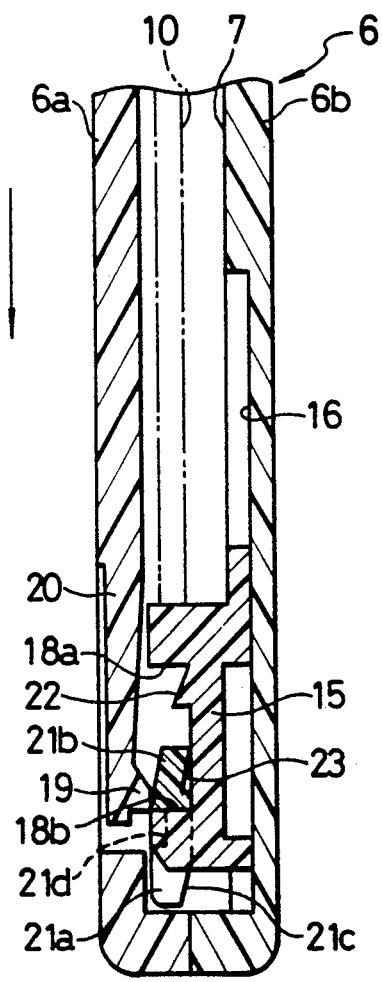

CARD CASE FOR AUTOMOBILE

BACKGROUND OF THE INVENTION

1. Field of the Invention

The present invention relates to a card case mounted within the vicinity of the driver's seat of an automobile for accommodating and holding therein a magnetic card such as, for example a prepaid type charge or credit card.

2. Description of the Prior Art

In recent years, prepaid cards have come into wide use for paying fees at toll houses, gas stations, and the like. Most drivers keep their prepaid cards in the glove compartment, the center console or the sun visor pocket.

In view of the inconvenience encountered heretofore in inserting a prepaid card into and taking it out of any one of these receptacles, the inventor has proposed a card case provided within the vicinity of the driver's seat for the exclusive use by means of the driver (Japanese Utility Model application No. 1-153049).

However, since the proposed card case has a relatively small card insertion slot, it is difficult to locate the card insertion slot under darkness conditions.

OBJECT OF THE INVENTION

The present invention has been accomplished to overcome the foregoing problem. The main object of the present invention is to provide a card case for an automobile which makes it possible to readily find the card insertion slot even under darkness conditions.

SUMMARY OF THE INVENTION

To achieve the aforementioned object, according to the present invention there is provided a card case mounted within the vicinity of the driver's seat of an automobile for accommodating and holding therein a magnetic card, which has a card accommodation portion provided upon the inner surface thereof an illuminating means and which further includes within the card accommodation portion a push member which is made of a light conductive material and which is adapted to be pushed inwardly by means of the insertion of a card, biasing means for biasing the push member in the direction of extracting the card, and a latch device for latching the push member at a card accommodation position within the card accommodation portion and, when the push member is pushed in further from the card accommodation position, for releasing the latched push member within the card accommodation portion.

With the construction described above, since the inner surface of the card accommodation portion is illuminated by the illuminating means, the card insertion slot can be easily located even under darkness conditions. Furthermore, since the push member is made of a light conductive material, the portion of the card accommodation portion along which the push member extends can be uniformly illuminated. Thus, it is possible to illuminate the inside of the card accommodation portion over a wide area using a single light source.

BRIEF DESCRIPTION OF THE DRAWINGS

The above and other objects, characteristic features and advantages of the present invention will become more apparent from the following description made hereinbelow with reference to the accompanying drawings in which like reference characters designate like or corresponding parts throughout the several views, and wherein:

FIG. 8 is a cross-sectional view illustrating the relationship defined between the card holder and the latch cam at still another position.

FIG. 9 is a cross-sectional view illustrating the relationship defined between the card holder and the latch cam at yet another position.

FIG. 10 is a cross-sectional view illustrating the relationship defined between the card holder and the latch cam at a further position.

FIG. 11 is a cross-sectional view illustrating the relationship defined between the card holder and the latch cam at a still further position.

DETAILED DESCRIPTION OF THE PREFERRED EMBODIMENT

The present invention will now be described in detail with reference to the illustrated embodiment.

Figure 1:
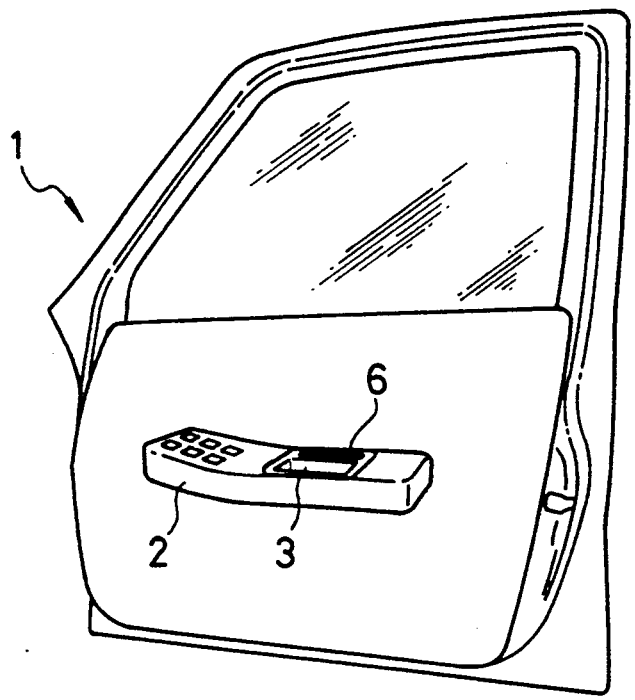
FIG. 1 is a perspective view illustrating one embodiment of the card case constructed according to the present invention and as applied to the inside of an automobile door.

FIG. 1 illustrates the inner surface of an automobile door 1 to which one embodiment of the card case constructed according to the present invention is applied. The inner surface of the door 1 is provided at a vertically central portion thereof with an elongated arm rest 2 extending in the horizontal or lateral direction. The top surface of the arm rest 2 is provided therein with an inside door handle 3 at a substantially central position thereof as considered in the longitudinal direction thereof.

Figure 2:
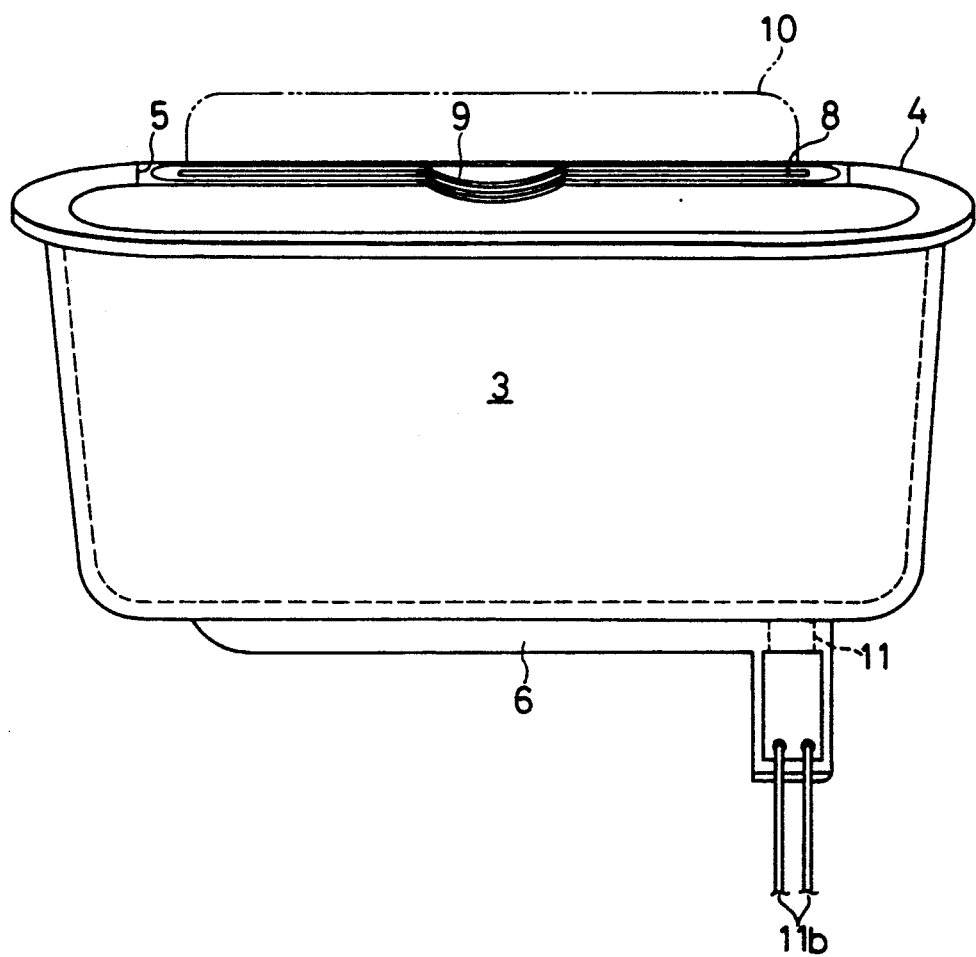
FIG. 2 is a front view illustrating the card case mounted upon the inside door handle.
Figure 3:
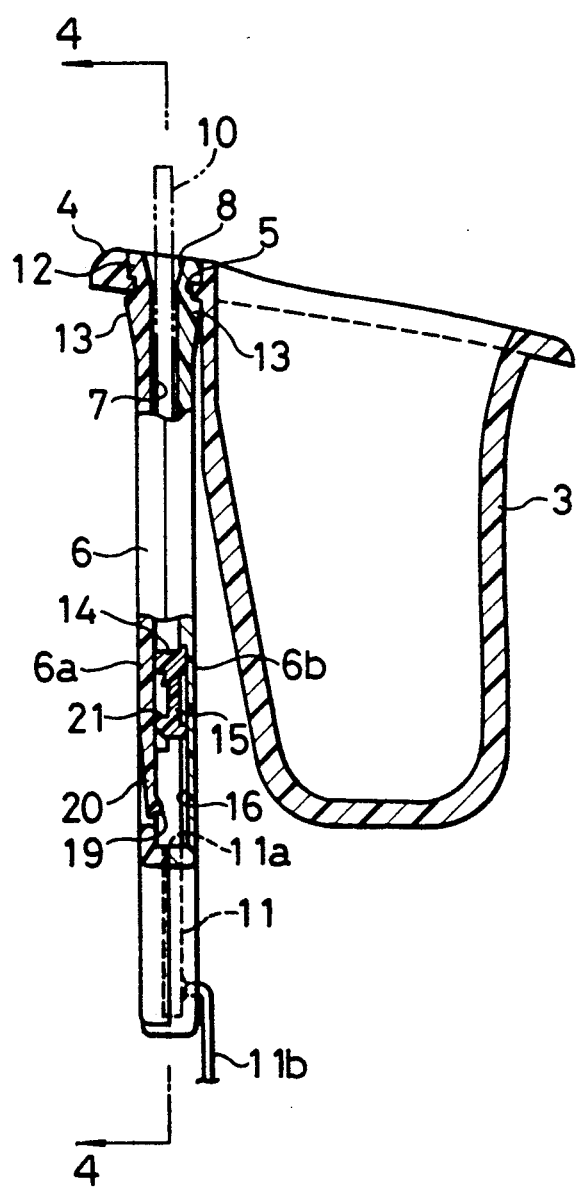
FIG. 3 is a partially sectioned left side view illustrating the card case of FIG. 2.

As illustrated in FIGS. 2 and 3, the inside door handle 3 is injection molded from a synthetic resin so as to have the shape of a cup open at the top and which is flat in the lateral direction so that the door 1 can be pulled shut by means of a person seated inside the automobile with the finger tips of the person inserted into the inside door handle 3. The inside door handle 3 has a flange or support member 4 defined around the top opening thereof. The flange or support member 4 has a rectangular hole 5 formed within a portion thereof disposed close to the door 1 and which is elongated in the lateral direction for a support member 4 permitting insertion of a card case 6 from a position above the hole 5 and flange. The inside door handle 3 having the card case 6 fitted within the rectangular hole 5 thereof is attached from above to the arm rest 2.

The card case 6 has a substantially rectangular shape and comprises a pair of thin plate members 6a and 6b, which are joined together and wherein each has a concave portion for constituting a card accommodation portion 7 having an elongated top slot 8 for permitting insertion of a card 10 and an arcuate notch 9 formed at a central portion thereof as considered along the longitudinal direction of the top slot 8 for use in pushing the card 10 deep into the card accommodation portion.

The card case 6 is provided at one end of the bottom portion thereof with a light emitting element 11, such as, for example, an LED, having a light emitting portion 11a directed toward the interior of the card accommodation portion 7. The light emitting element 11 is connected by means of lead wires 11b to a battery (not shown) and the light emitting portion 11a can be turned on and off as a result of operating a separate control switch (not shown).

The open end of the slot 8 of the card case 6 is formed with a flange 12 extending over the entire periphery thereof so as to abut the peripheral surface of the rectangular hole 5 formed within the flange or support member 4 of the inner door handle 3. The outer surfaces of the plate members 6a and 6b are each formed with a pair of engaging claws 13 disposed at intermediate positions along the lengthwise direction thereof so as to face or abut the lower surface of the flange 12. The periphery of the rectangular hole 5 of the inner door handle 3 is interposed between the lower surface of the flange 12 and the engaging claws 13 so as to fix the card case 6 within the inner door handle 3.

Figure 4:
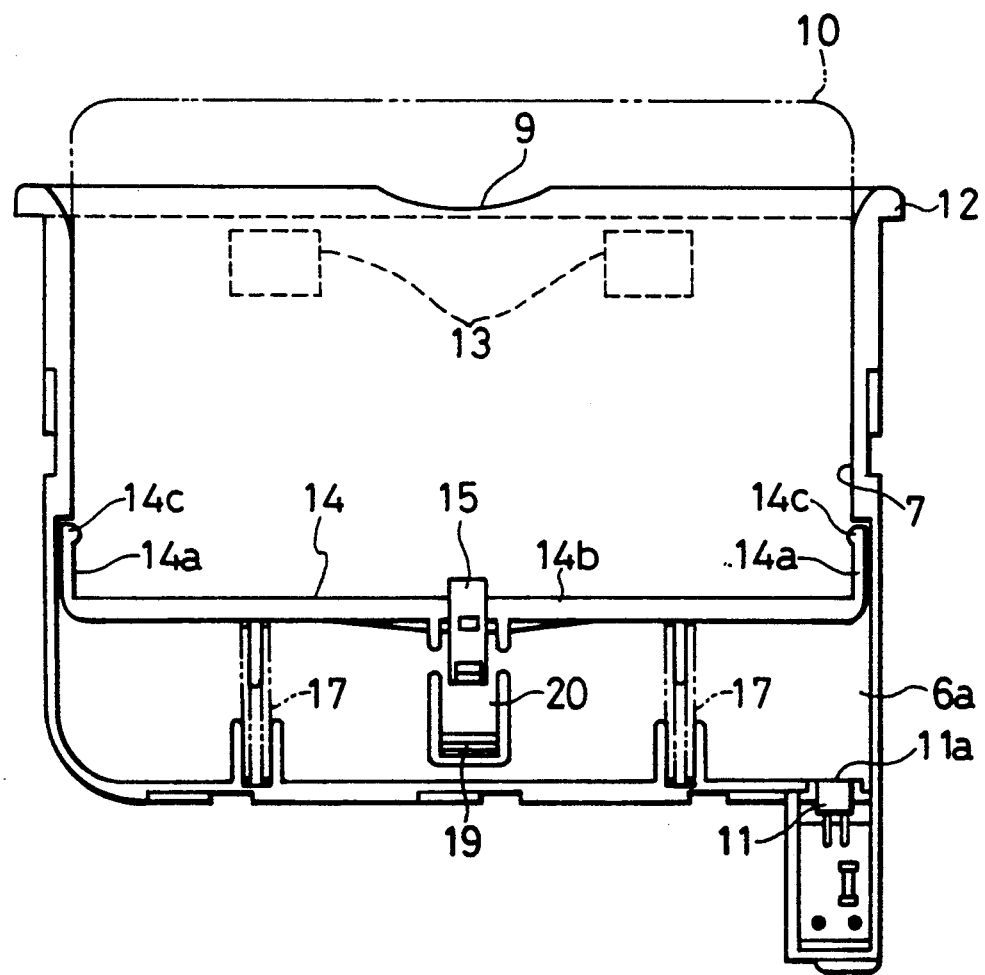
FIG. 4 is a cross-sectional view taken along line 4—4 in FIG. 3.

As is illustrated in FIG. 4, a substantially U-shaped card holder 14 serving concurrently as a push member is accommodated within the card accommodation portion 7 of the card case 6 and comprises a pair of arms 14a which are directed toward the open end of the card accommodation portion 7 and a main body 14b connecting the proximal ends of the arms 14a. The card holder 14 is made of a light conductive material such as, for example, transparent acryl resin. The main body 14b of the card holder 14 is provided with a block member 15 projecting in the card inserting and extracting directions and which, as shown in FIG. 3, is slidably disposed with a guide groove 16 formed within the inner surface of the plate member 6b at a lower position thereof and extending in the card inserting and extracting directions. The slidable movement of the card holder 14 is regulated by means of the guide groove 16.

Between the inner bottom portion of the card accommodation portion 7 and the lower surface of the main body 14b of the card holder 14, a pair of compression coil springs 17 are interposed so as to bias the card holder 14 in the card extracting direction. When no force is applied to the card 10 accommodated within the card accommodation portion 7, the card holder 14 is retained by means of the biasing force of the compression coil springs 17 at the uppermost position of the guide groove 16 regulating the slidable movement of the card holder 14. In this state, as shown in FIG. 4 the lower end of the card 10 is supported upon the card holder 14 and the upper end thereof projects outwardly from the open end of the card accommodation portion 7.

The arms 14a of the card holder 14 are provided upon the free ends thereof with pawls 14c which project inwardly toward each other. When a card 10 is inserted into the card accommodation portion 7 so as to abut against the pawls 14c, the arms 14a are flexed away from each other so as to resiliently pinch the opposite sides of the card 10 between the pawls 14c. When the card 10 is pushed downwardly from this position against the biasing force of the compression coil springs 17, the lower end of the card 10 abuts against the main body 14b of the card holder 14 so as to push the card holder 14 downwardly.

As is illustrated in FIG. 5 to FIG. 11, the surface of the block member 15 which is disposed opposite the surface thereof facing the guide groove 16 is formed with stepped portions 18a and 18b which are spaced apart vertically with respect to each other. The plate member 6a is integrally provided with a resilient piece 20 which has an inward projection 19 at the free end thereof. When the card 10 is substantially entirely accommodated within the card accommodation portion 7, the inward projection 19 engages the lower stepped portion 18b of the block member 15 as a result of the resiliency of the resilient piece 20. In this state, the card holder 14 is prevented from undergoing slidable movement in the card extracting direction and the card 10 is retained within the card accommodation portion 7 as shown in FIG. 9.

A latch cam 21 is attached to the block member 15 so that it is freely movable from its position in contact with the upper stepped portion 18a to its position in contact with the lower stepped portion 18b as shown in FIGS. 8 and 11, respectively. However, while the reverse movement of the latch cam 21 is permitted until the latch cam 21 abuts a triangular projection 22 formed between the upper and lower stepped portions 18a and 18b, further reverse movement thereof is prevented by means of the triangular projection 22.

Figure 5:
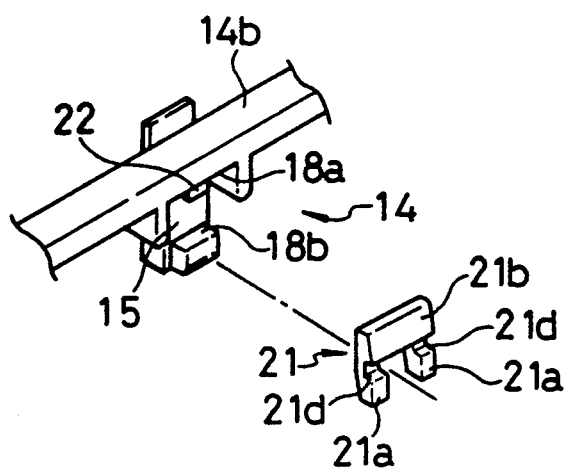
FIG. 5 is a partially cutaway, exploded perspective view illustrating the relationship defined between the card holder and the latch cam.
Figure 7:
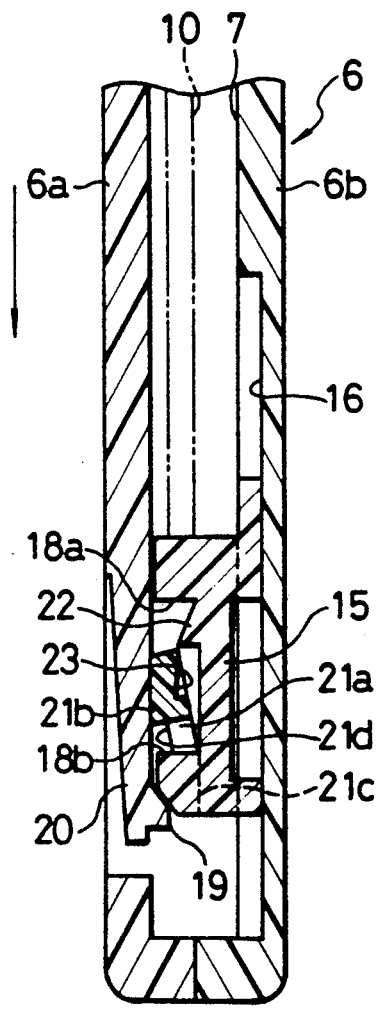
FIG. 7 is a cross-sectional view illustrating the relationship defined between the card holder and the latch cam at another position.

To be more specific, as illustrated in FIG. 5, the latch cam 21 comprises a pair of legs 21a and a bridge portion 21b connecting the legs so as to form a substantially inverted U shape. The bridge 21b is located between the upper and lower stepped portions 18a and 18b of the block member 15 and the legs 21a are disposed at the lateral sides of the lower stepped portion 18b. The upper portion of the bridge 21b of the latch cam 21 facing the block member 15 is formed with a triangular groove 23 in which the triangular projection 22 of the block member 15 is complementarily fitted when the bridge 21b of the latch cam 21 abuts the upper stepped portion 18a of the block member 15 (FIG. 8). The lower portions of the legs 21a of the latch cam 21 facing the block member 15 are formed with slopes 21c. For this reason, the bridge 21b of the latch cam 21 can be disposed in an inclined mode with respect to the plate member 6a until the slopes 21c come into contact with the flat surface of the block member 15 (FIG. 7). When the bridge 21b has been inclined, the latch cam 21 moves upwardly, passes beyond the triangular projection 22 and contacts the upper stepped portion 18a of the block member 15. The legs 21a of the latch cam 21 are provided at their respective proximal ends with engaging grooves 21d which are disposed between the triangular projection 22 and the lower stepped portion 18b when the bridge 21b of the latch cam 21 abuts either the triangular projection 22 of the block member 15 or the upper stepped portion 18a of the block member 15 and are adapted to receive the inward projection 19 formed upon the resilient piece 20 of the plate member 6a (FIGS. 8 and 9).

The operation of the card case 6 according to the present invention will now be described.

Figure 6:
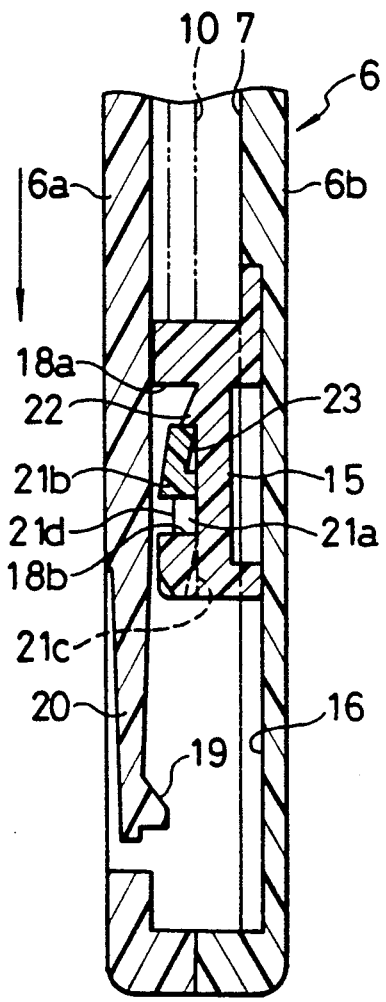
FIG. 6 is a cross-sectional view illustrating the relationship defined between the card holder and the latch cam at one position.

Prior to the insertion of a card 10, the card holder 14 is retained in contact with the upper end of the guide groove 16 by means of the biasing force of the compression coil springs 17, whereas the latch cam 21 is disposed so as to be slidable downwardly from the triangular projection 22 to the lower stepped portion 18b of the block member 15 (FIG. 6).

Insertion of a card 10 into the card case 6 through means of the slot 8 allows the lower end of the card 10 to abut the card holder 14 and the upper end thereof to project outwardly from the open end of the card accommodation portion 7. When the card 10 is pushed inwardly from the inserted position against the biasing force of the compression coil springs 17, the card holder 14 is pushed toward the deepest possible position, at which the block member 15 abuts the lower end of the guide groove 16.

When the free ends of the legs 21a of the latch cam 21 are brought into contact with the inner projection 19 within the card accommodation portion 7 as a result of the card holder 14 being pushed downwardly, the latch cam 21 is pressed upwardly and moves in a sliding fashion to a position at which the top of the bridge 21b of the latch cam 21 abuts the triangular projection 22 of the block member 15. As soon as the upward slidable movement of the latch cam 21 is restricted by means of the triangular projection 22, the free ends of the legs 21a of the latch cam 21 are pressed against the inclined surface of the inner projection 19 and consequently the latch cam 21 continues to move in an inclined mode until the slopes 21c of the latch cam 21 abut the flat surface of the block member 15 (FIG. 7). This inclined disposition allows the latch cam 21 to pass beyond the triangular projection 22.

Since the inner projection 19 still abuts the free ends of the legs 21a so as to push the latch cam 21 upwardly, the latch cam 21 moves upwardly until the upper end of the bridge 21b abuts against the upper stepped portion 18a, whereas the card holder 14 is pushed downwardly. At this time, since the resilient piece 20 is flexed outwardly, the lower end of the block member 15 clears the inner projection 19 and, while the lower ends of the legs 21a of the latch cam 21 slide upon the inner projection 19, the card holder 14 is pushed inwardly so as to reach the deepest possible position, at which the lower end of the block member 15 abuts the lower end of the guide groove 16 (FIG. 8).

At the deepest possible position, the bridge 21b of the latch cam 21 abuts the upper stepped portion 18a of the block 15 and the engaging grooves 21d of the latch cam 21 are disposed between the triangular projection 22 of the block member 15 and the lower stepped portion 18b so as to receive the inner projection 19 due to the resiliency of the resilient piece 20.

In this state, when the application of pressure upon the card 10 is released, the card holder 14 is urged upwardly by means of the biasing force of the compression coil springs 17. At this time, since the inner projection 19 is engaged within the engaging grooves 21d of the latch cam 21, the latch cam 21 and the card holder 14 move in opposite directions. Consequently, the lower stepped portion 18b of the block member 15 is stopped by means of the inner projection 19 at a position slightly higher than the deepest possible position. At this position the latch cam 21 is retained between the lower stepped portion 18b and the triangular projection 22 (FIG. 9). As a result, the card 10 is substantially entirely accommodated within the card accommodation portion 7. In the accommodated state of the card 10, since the card 10 is clamped between the arms 14a of the card holder 14 due to the resiliency of the arms 14a, the card 10 is prevented from rattling within the card accommodation portion 7.

The accommodated card 10 can be extracted from portion by again pushing the card 10 downwardly utilizing the notch 9, thereby pushing the card holder 14 to the deepest possible position within the card accommodation portion 7 (FIG. 10). As a result, the latch cam 21 is pressed by means of the triangular projection 22 so as to move the latch cam 21 downwardly along with the card holder 14 and, at the deepest possible position, the card holder 14 is pressed by means of the bridge 21b of the latch cam 21 so as to disengage the inner projection 19 from the engaging grooves 21d of the latch cam 21 within the card accommodation portion 7.

Then, by releasing the pushing force impressed upon the card 10, the card holder 14 is pushed backwardly toward the initial position shown in FIG. 4 from the deepest possible position. At this time, as a result of the friction between the latch cam 21 and the inner projection 19, the latch cam 21 abuts the lower stepped portion 18b and the surfaces of the bridge 21b and lower stepped portion 18b which are both facing the inner projection 19 become flush with each other. Therefore, the inner projection 19 cannot catch the lower stepped portion 18b during the upward movement of the card holder 14, thereby permitting the card holder 14 to be pushed backwardly toward the initial position by means of the biasing force of the compression coil springs 17. Consequently, the upper end of the card 10 increasingly projects from the slot 8 of the card accommodation portion 7 so as to make it possible to readily extract the card 10.

The switch for the light emitting element 11 used as the illuminating means for illuminating the card accommodation portion 7 may be ganged with the switch for the automobile headlights or the like. An LED is desirably used as the light emitting element 11 in consideration of power consumption and may be set to emit light all the time during the illumination of the headlights or clearance lamps. Furthermore, in the case where the movement of the card holder 14 is sensed by means of a separate limit switch, the LED may be arranged so as to emit light only when a card is not accommodated within the card accommodation portion 7. The card holder 14 is desirably formed in the shape of a prism or lens in order to enhance the diffusion of light therethrough.

According to the present invention, as described above, since the card accommodation portion is illuminated with light, the location of the card insertion slot can be readily confirmed even under darkness conditions. Furthermore, since the card holder extending laterally within the card accommodation portion is made of a light conductive material, the light from a single light source can be diffused so as to illuminate the card insertion portion over the entire bottom portion thereof. Thus, the card case of the present invention can be advantageously utilized.

Obviously, many modifications and variations of the present invention are possible in light of the above teachings. It is therefore to be understood that within the scope of the appended claims, the present invention may be practiced otherwise than as specifically described herein.

What is claimed is:

1. In combination with an interior passenger compartment of a motor vehicle, a card case comprising:

a support member fixedly mounted within said interior passenger compartment of said motor vehicle;

a card case having an interior cavity defined therein for accommodating and holding a card therewithin;

slot means defined within said support member of said motor vehicle for fixedly accommodating and retaining said card case within said support member of said motor vehicle; and illuminating means operatively connected to said card case disposed within said slot means defined within said support member of said motor vehicle for illuminating said interior cavity of said card case so as to facilitate location of said card case under dark conditions in order to facilitate at least one of insertion and removal of said card with respect to said card case.

2. The combination as set forth in claim 1, further comprising:

a card holder, for holding said card therewithin, movably mounted with said interior cavity of said card case between a first position at which said card is housed substantially entirely within said interior cavity of said card case, and a second position at which said card is partially ejected from said card case so as to facilitate extraction of said card from said card case;

latching means defined between said card holder and said card case for releasably latching said card holder and said card mounted therein at said first position within said card case; and biasing means interposed between said card holder and said card case for biasing said card holder toward said second position.

3. The combination as set forth in claim 2, further comprising:

notch means defined within an outer edge portion of said card case for enabling an outer edge portion of said card to be pushed inwardly into said card case when said card holder and said card are disposed at said first latched position so as to release said releasable latching means and thereby permit said biasing means to move said card holder and said card toward said second position at which said card can be extracted from said card holder.

4. The combination as set forth in claim 2, wherein:

said card holder comprises a base portion and a pair of arm portions extending outwardly from said base portion for flexibility and resiliently engaging side portions of said card so as to retain said card within said card holder and within said card case.

5. The combination as set forth in claim 2, wherein:

said biasing means comprises a plurality of coil springs interposed between a bottom portion of said card holder and a bottom portion of said card case.

6. The combination as set forth in claim 5, wherein:

said illuminating means is operatively connected to said bottom portion of said card case.

7. The combination as set forth in claim 2, wherein:

said card holder is fabrication from a light transmissive material.

8. The combination as set forth in claim 5, wherein:

said light transmissive material comprises a transparent acryl resin.

9. The combination as set forth in claim 1, wherein:

said illuminating means comprises an LED.

10. The combination as set forth in claim 1, wherein:

said interior passenger compartment of said motor vehicle comprises a passenger arm rest fixedly mounted upon an interior surface of a vehicle door, and hollow door handle means defined within said arm rest; and said support member, within which said slot means is defined for accommodating said card case, is formed as a portion of said hollow door handle means.

* * * * *